United States Patent [19]

Underwood et al.

[11] Patent Number: 5,791,986
[45] Date of Patent: Aug. 11, 1998

[54] COMBINE RIPPLE PAN

[75] Inventors: Mark Ray Underwood, Burr Oak; Sushil V. Dwyer, Arkansas City, both of Kans.

[73] Assignee: Deere & Company, Moline, Ill.

[21] Appl. No.: 777,520

[22] Filed: Dec. 30, 1996

[51] Int. Cl.[6] .................................................. A01F 12/30
[52] U.S. Cl. .............................. 460/101; 460/85; 460/90; 460/145
[58] Field of Search .................... 460/101, 71, 72, 460/84, 85, 102, 90, 91, 92, 93, 94, 95, 145, 146, 147, 148, 901

[56] References Cited

U.S. PATENT DOCUMENTS

| 990,804 | 4/1911 | Clymans . |
| 3,734,103 | 5/1973 | Mathews . |
| 4,489,733 | 12/1984 | Underwood . |
| 4,535,787 | 8/1985 | Underwood . |
| 4,557,276 | 12/1985 | Hyman et al. . |
| 4,561,972 | 12/1985 | Alm .................................. 460/90 X |
| 4,875,889 | 10/1989 | Hagerer et al. . |
| 4,968,284 | 11/1990 | Klimmer et al. . |

*Primary Examiner*—Terry Lee Melius
*Attorney, Agent, or Firm*—James E. Bradley

[57] ABSTRACT

The invention provides an improved ripple pan which compensates for the over-deposition of threshed grain onto the outer portions of the grain pan by channeling the grain to the center of the pan. The pan has a central section with ripples that are perpendicular to the flow of the grain, and two outer sections with outer edges that are elevated above the central section. The ripples on the two outer sections are biased such that the outer edges of the ripples are located rearward of the inner edges of the ripples. An alternate embodiment of this invention solves the problem of excessive grain deposition in the central section of the ripple pan. This embodiment has two outer sections configured similarly to the first embodiment and a central section with a center peak which slopes downward on either side of the peak to the inner edges of the outer sections.

10 Claims, 4 Drawing Sheets

1

COMBINE RIPPLE PAN

TECHNICAL FIELD

This invention relates to grain combines and more particularly to the use of a channeling ripple pan to compensate for the tendency of a threshing apparatus to deposit threshed grain preferentially in one section or another of the ripple pan. The ripple pan is also able to compensate to some extent for the gravity induced drift of threshed grain toward the edge of the pan.

BACKGROUND ART

The threshing section of a grain combine comprises a threshing rotor which rotates inside a rotating threshing cage with a perforated screen through which grain escapes from the threshing cage. Beneath the threshing cage is a ripple pan and grain sieves. The ripple pan transports grain from the threshing section to the sieves for further cleaning. Ripple pans of the prior art are substantially flat and have ripples with a saw-tooth cross-section. As grain falls onto the ripple pan from the threshing section, the pan is oscillated vertically and horizontally. As the pan reverses horizontal direction, the grain is tossed rearward on the pan and eventually onto the sieves. The ripples prevent the grain from returning forward when the pan reverses direction again. The prior art ripples are perpendicular to the flow of the grain across the surface of the ripple pan.

One problem with ripple pans that is unique to bi-rotor type combines is the tendency to deposit the threshed grain along the outer edges of the ripple pan. This preferential deposition is problematic since the grain builds up on one side and may overload the grain separation system or create higher grain losses that result from an overload of one side of the sieve system.

All combines face the problem of gravity-induced migration of the grain to the downhill side of the ripple pan. Some prior art ripple pans have used electronic control systems which disperse the grain more evenly. Other ripple pans have used vanes to prevent the grain from migrating on the pan. These devices do not solve the outer edge deposition problem created by bi-rotor combines. The electronic control system requires input based on the gravity-induced force of the grain against mobile vanes, a force not present in outer edge deposition. Vanes also fail to solve the problem as they would merely channel the grain along the outer edges to the rearward portion of the ripple pan.

DISCLOSURE OF THE INVENTION

The invention provides an improved ripple pan which compensates for the over-deposition of threshed grain onto the outer portions of the pan by channeling the grain to the center of the pan. The pan is divided into three longitudinal sections. The central section is flat and has a standard configuration of ripples perpendicular to the flow of the grain. The two outer sections extend from the outer edges of the central section, but are tilted slightly downward where they attach to the central section such that the outer edges of the outer section are elevated above the central section. The ripples on the two outer sections are biased such that the outer edges of the ripples are located rearward of the inner edges of the ripples. This configuration forces the grain to migrate toward the central section while keeping the outer sections of the ripple pan relatively clear for new grain.

An alternate embodiment of this invention solves the problem of excessive grain deposition in the central section of the ripple pan. This embodiment has two outer sections configured similarly to the first embodiment. However, the central section utilizes a center peak which slopes downward on either side of the peak to the inner edges of the outer sections, giving the transverse section of the ripple pan a W-shape. This embodiment channels the grain into two relatively equal streams in the two valleys between the sections of the ripple pan.

DETAILED DESCRIPTION OF THE INVENTION

Figure 1:
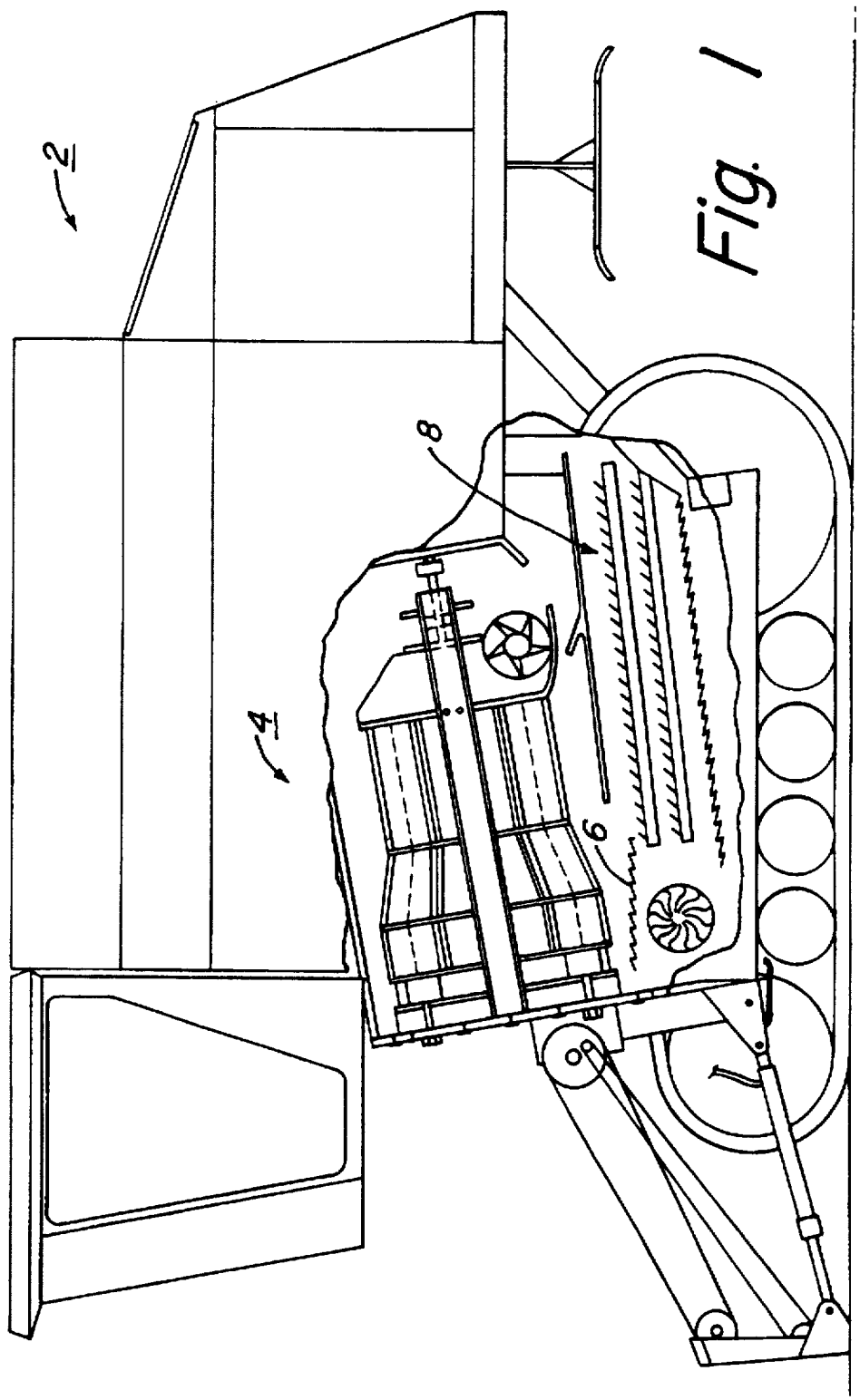
FIG. 1 is a schematic view of a grain combine showing the relative positions of the components of the combine.

Referring to FIG. 1, a grain combine 2 includes a threshing section 4 and a ripple pan 6. Rearward of ripple pan 6 is a sieve section 8. Threshing section 4 threshes grain and chaff before distributing them onto ripple pan 6. Ripple pan 6 oscillates horizontally and vertically around axis 16 and tosses the grain and chaff onto sieve section 8 for separation.

Figure 2:
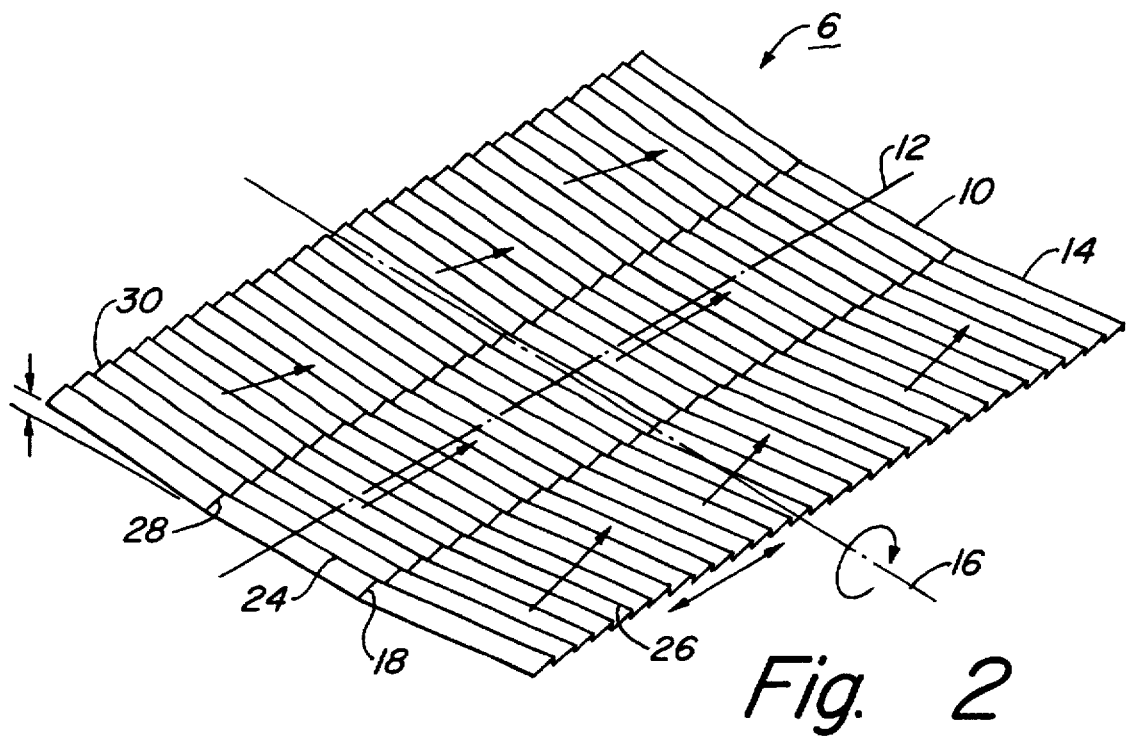
FIG. 2 is a perspective view of a ripple pan constructed in accordance with a first embodiment of the invention.
Figure 3:
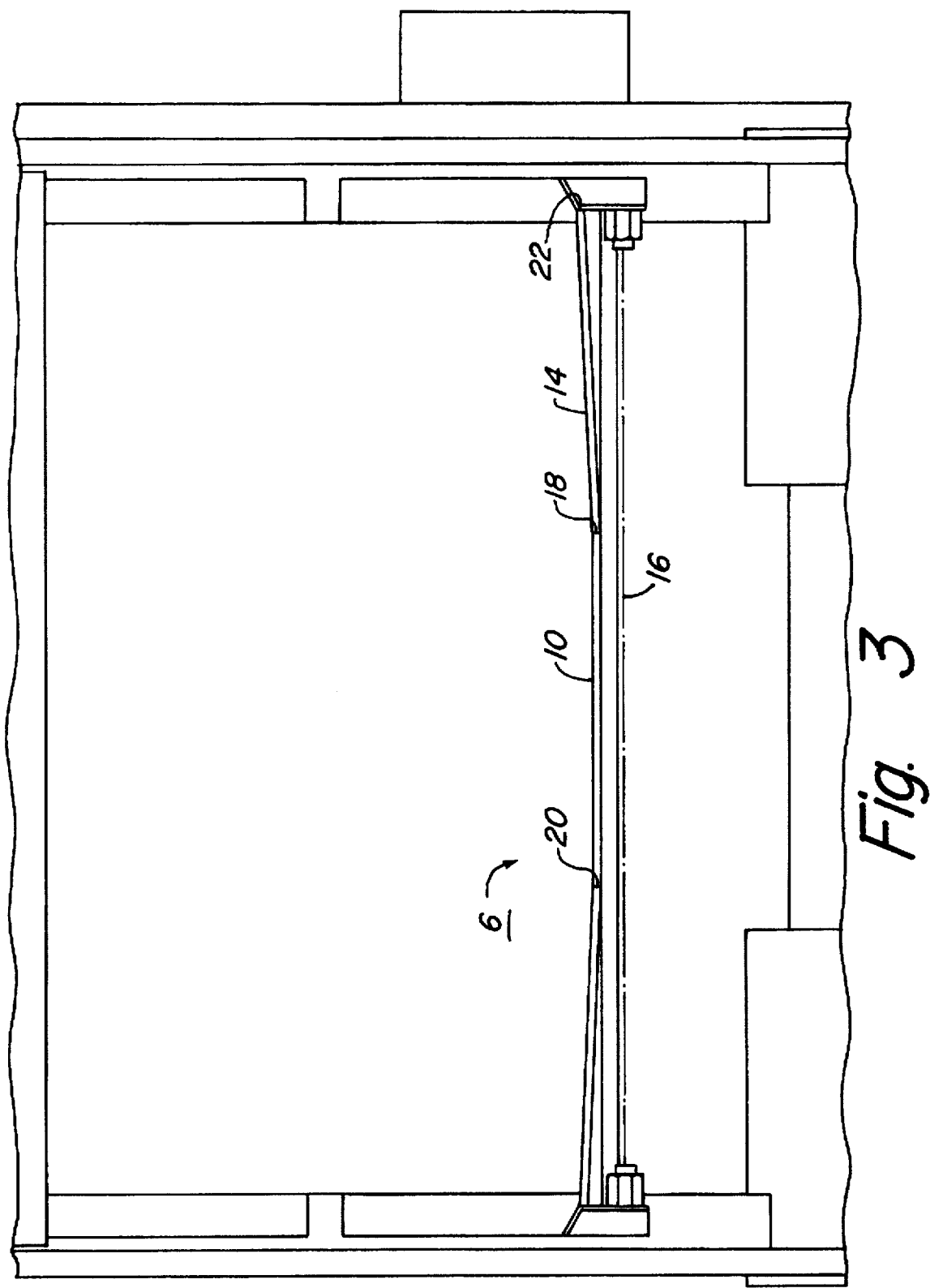
FIG. 3 is a sectional front view of the ripple pan of FIG. 2.

Referring to FIGS. 2 and 3, a first embodiment of the invention is shown. Ripple pan 6 has a longitudinal axis 12 that is transverse to oscillation axis 16. Ripple pan 6 has a central section 10 and an outer section 14 on each side of central section 10. Central section 10 has two outer edges 18 and lies in a horizontal plane relative to grain combine 2. Outer sections 14 each have an inner edge 20 which attaches to an outer edge 18 of central section 10. The inner edge 20 of each outer section 14 is lower in elevation than an outer edge 22 of each outer section 14 such that each outer section 14 slopes downward toward central section 10.

Each section has a plurality of ripples which are essentially saw-tooth in cross section. Ripples 24 on central section 10 are perpendicular to longitudinal axis 12. Ripples 26 on outer sections 14 each have an inner edge 28 and an outer edge 30. Ripples 26 on outer sections 14 are skewed relative to longitudinal axis 12 such that each outer edge 30 is located rearward of each inner edge 28. Ripples 26 smoothly transition to ripples 24 where outer sections 14 attach to central section 10.

In operation, the first embodiment more evenly distributes crop material that is disproportionately deposited on outer sections 14 of ripple pan 6. As ripple pan 6 oscillates, the crop material is thrown rearward by ripples 26. The skewed configuration of ripples 26 simultaneously directs the crop material toward and onto central section 10. As the crop material travels down ripple pan 6, both ripples 24 and ripples 26 continue to throw the crop material rearward. The saw-tooth cross-section of the ripples does not permit the crop material to return in a forward direction as ripple pan 6 oscillates. When the crop material reaches the rearward end of ripple pan 6 it is thrown onto sieve section 8.

Figure 4:
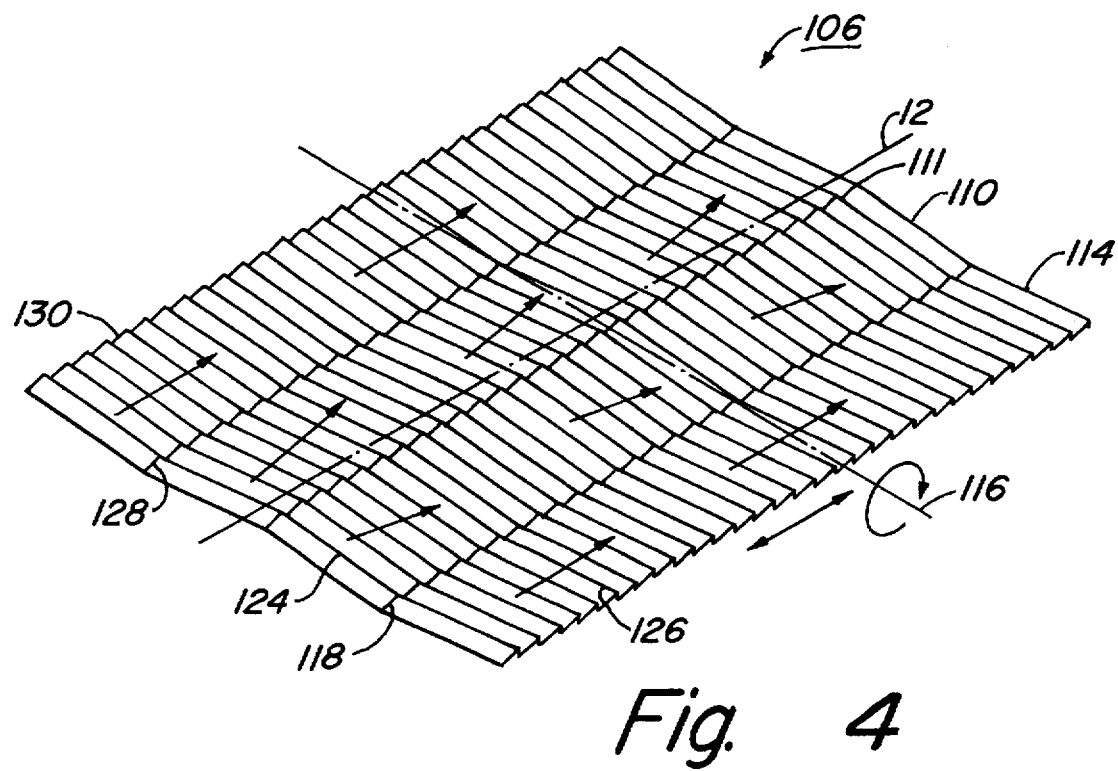
FIG. 4 is a perspective view of a ripple pan constructed in accordance with a second embodiment of the invention.
Figure 5:
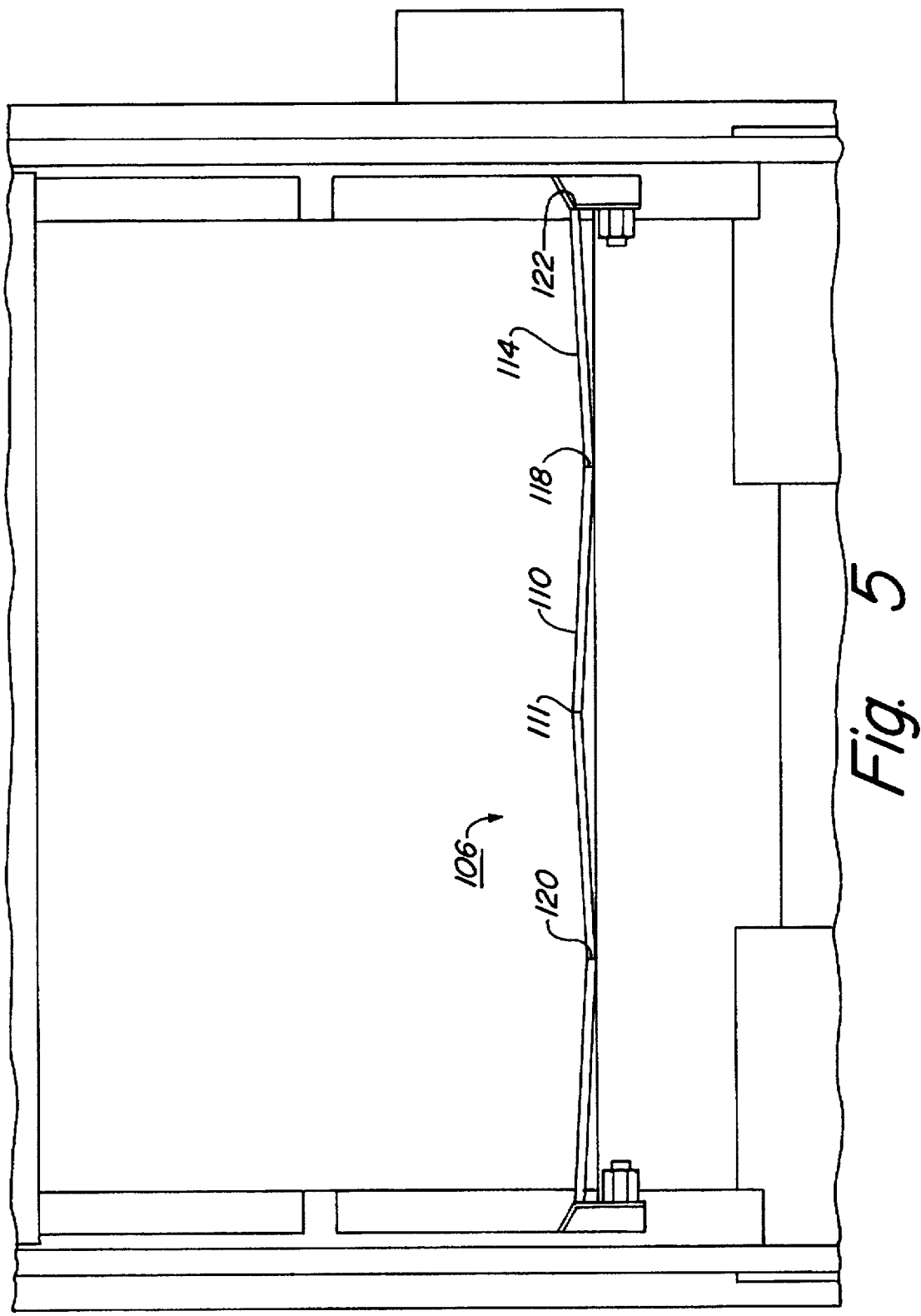
FIG. 5 is a sectional front view of the ripple pan of FIG. 4.

Referring to FIGS. 4 and 5, a second embodiment of the invention is shown. Ripple pan 106 has a longitudinal axis 112 that is transverse to an oscillation axis 116. Ripple pan 106 has a central section 110 and an outer section 114 on each side of central section 110. Central section 110 has a center peak 111 and two outer edges 118. Outer edges 118 lie in a horizontal plane relative to grain combine 2 while center peak 111 is elevated above outer edges 118. Outer sections 114 each have an inner edge 120 which attaches to an outer edge 118 of central section 110. The inner edge 120 of each outer section 114 is lower in elevation than an outer edge 122 of each outer section 114 such that each outer section 114 slopes downward toward central section 110.

Each section has a plurality of ripples which are essentially saw-tooth in cross section. Ripples 124 on central section 110 follow the contours of the section from one outer edge 118 to center peak 111 to the other outer edge 118. Each ripple 124 is also skewed slightly relative to oscillation axis 116 such that the portion of ripple 124 forming peak 111 is located rearward of the portion of ripple 124 forming outer edge 118. Ripples 126 on outer sections 114 each have an inner edge 128 and an outer edge 130. Ripples 126 are skewed relative to longitudinal axis 112 such that each outer edge 130 is located rearward of each inner edge 128. Ripples 126 smoothly transition to ripples 124 where outer sections 114 attach to central section 110.

In operation, the second embodiment more evenly distributes crop material that is disproportionately deposited on central section 110 of ripple pan 6. As ripple pan 6 oscillates, the crop material is thrown rearward by ripples 124. The skewed configuration of ripples 124 simultaneously directs the crop material toward and onto outer sections 114. As the crop material travels down ripple pan 6, both ripples 124 and ripples 126 continue to throw the crop material rearward. The saw-tooth cross-section of the ripples does not permit the crop material to return in a forward direction as ripple pan 6 oscillates. When the crop material reaches the rearward end of ripple pan 6 it is thrown onto sieve section 8.

The invention has several advantages. The first embodiment compensates for the over-deposition of threshed grain onto the outer portions of the pan by channeling the grain to the center of the pan. The second embodiment solves the problem of excessive grain deposition in the central section of the ripple pan by channeling the grain into two relatively equal streams in the two valleys between the sections of the ripple pan.

While the invention has been shown in only one of its forms, it should be apparent to those skilled in the art that it is not so limited, but is susceptible to various changes without departing from the scope of the invention.

We claim:

1. A ripple pan in a grain combine having a central section and two outer sections, each section extending from a rearward end of the ripple pan to a forward end of the ripple pan, and each of the sections being impermeable to the passage of grain and having a plurality of ripples which are saw-tooth in cross-section, and wherein the central section has a different angle of inclination relative to a horizontal plane of the combine than the outer sections so as to direct the flow of grain.

2. The ripple pan according to claim 1 wherein the central section is parallel to the horizontal plane, and wherein the outer sections incline inward to the central section, the outer sections having outer edges at a higher elevation than the central section.

3. A ripple pan in a grain combine having a central section and two outer sections, each section extending from a rearward end of the ripple pan to a forward end of the ripple pan, and each of the sections having a plurality of ripples which are saw-tooth in cross-section, and wherein the central section has a different angle of inclination relative to a horizontal plane of the combine than the outer sections so as to direct the flow of grain; and wherein the ripples on the outer sections are skewed relative to a longitudinal axis of the ripple pan, the ripples on the outer sections having inner edges and outer edges, the outer edges being more rearward than the inner edges, and the ripples on the central section are perpendicular to the longitudinal axis.

4. A ripple pan in a grain combine having a central section and two outer sections, each section extending from a rearward end of the ripple pan to a forward end of the ripple pan, and each of the sections having a plurality of ripples which are saw-tooth in cross-section, and wherein the central section has a different angle of inclination relative to a horizontal plane of the combine than the outer sections so as to direct the flow of grain; and wherein the central section has a center peak and two downward sloping side portions.

5. A ripple pan in a grain combine, the grain combine having a threshing apparatus for threshing crop material and a sieve apparatus for separating grain from chaff, the grain and chaff falling from the threshing apparatus to the ripple pan, the ripple pan oscillating for delivering grain and chaff rearward to the sieve apparatus, the ripple pan being impermeable to the passage of grain and comprising:

a central section extending from a forward end to a rearward end of the ripple pan, the central section having two parallel outer edges; and two outer sections extending from the forward end to the rearward end of the ripple pan, the outer sections having parallel inner and outer edges, the inner edge of each outer section being joined to one of the outer edges of the central section, and each outer section being slightly tilted relative to the central section with the outer edges of each outer section being elevated from the inner edge of each outer section; and wherein each of the sections contains a plurality of ripples extending from the forward end to the rearward end of the ripple pan, the ripples being triangular in cross-section.

6. A ripple pan in a grain combine, the grain combine having a threshing apparatus for threshing crop material and a sieve apparatus for separating grain from chaff, the grain and chaff falling from the threshing apparatus to the ripple pan, the ripple pan oscillating for delivering grain and chaff rearward to the sieve apparatus, the ripple pan comprising:

a central section extending from a forward end to a rearward end of the ripple pan, the central section having two parallel outer edges; and two outer sections extending from the forward end to the rearward end of the ripple pan, the outer sections having parallel inner and outer edges, the inner edge of each outer section being joined to one of the outer edges of the central section, and each outer section being slightly tilted relative to the central section with the outer edges of each outer section being elevated from the inner edge of each outer section; and wherein each of the sections contains a plurality of ripples extending from the forward end to the rearward end of the ripple pan, the ripples of the central section being perpendicular to a longitudinal axis of the ripple pan, the ripples on the outer sections being skewed relative to the longitudinal axis of the ripple pan with the outer edges of the ripples of the outer sections being more rearward than the inner edges of the ripples of the outer sections.

7. In a grain combine having a threshing apparatus for threshing crop material and a sieve apparatus for separating grain from chaff, the grain and chaff falling from the threshing apparatus to a ripple pan, the ripple pan oscillating for delivering grain and chaff rearward to the sieve apparatus, the ripple pan comprising:

- a central section extending from a forward end to a rearward end of the ripple pan, the central section having a center peak, two downward sloping side portions, and two parallel outer edges; and
- two outer sections extending from the forward end to the rearward end of the ripple pan, the outer sections having parallel inner and outer edges, the inner edge of each outer section being joined to one of the outer edges of the central section, and each outer section being slightly tilted relative to the central section with the outer edges of each outer section being elevated from the inner edge of each outer section.

8. The ripple pan according to claim 7, wherein each of the sections contains a plurality of ripples extending from the forward end to the rearward end of the ripple pan, the ripples being triangular in cross-section.

9. The ripple pan according to claim 7 wherein each of the sections contains a plurality of ripples extending from the forward end to the rearward end of the ripple man, the ripples of the central section being perpendicular to a longitudinal axis of the ripple pan, the ripples on the outer sections being skewed relative to the longitudinal axis of the ripple pan with the outer edges of the ripples of the outer sections being more rearward than the inner edges of the ripples of the outer sections.

10. The ripple pan according to claim 7 wherein the ripples are saw-tooth in cross-section.

* * * * *